Patented Sept. 7, 1926.

1,599,031

UNITED STATES PATENT OFFICE.

KENNETH K. JONES, OF CHICAGO, ILLINOIS, ASSIGNOR TO SWIFT & COMPANY, OF CHICAGO, ILLINOIS, A CORPORATION OF ILLINOIS.

FOOD PRODUCT.

No Drawing.    Application filed August 4, 1925. Serial No. 48,143.

This invention relates to new food products designed particularly for animal feeding; and includes the new food products themselves as well as the method of producing the same.

The new food products are fermented food products made from blood admixed with a carbohydrate and to which a suitable culture of a harmless or beneficient species of micro-organism has been added.

It is well known that the blood of the common meat-producing animals is an extremely poor food and will not support life. It is also well known that it is difficult to supplement blood so as to make it a satisfactory food.

The new method of the present invention results in the production of a fermented food product made from blood and which is a valuable addition to the list of available animal foods.

In carrying out the process of the present invention and in making the new food products, blood is taken, together with suitable carbohydrate material, and there is added to it a suitable culture of a harmless or beneficent species of micro-organism or bacteria. The micro-organisms which are particularly advantageous are yeasts or ferments of which ordinary yeast is an example; and the invention will be more particularly described in connection therewith. The following specific example further illustrates the invention, but the invention is not limited thereto.

Raw animal blood as derived from cattle, sheep, hogs or other edible food animals, is admixed with a suitable carbohydrate such as starch, glucose, cane sugar or other carbohydrate-containing material, e. g., bran or paunch contents. A wide latitude is permissible as to proportions and the amount of carbohydrate. This amount may for example be such that in the dry finished product it varies from about 10 to about 90 per cent. To the mixture of blood and carbohydrate, an amount of yeast is added which may vary for ordinary purposes from about 2 to about 20 per cent of the final dry product. The mixture is allowed to ferment a suitable length of time and is then dried and ground.

Depending upon the proportions of blood and carbohydrate and the amount of yeast added, the product will vary in its content of carbohydrate and of yeast. During the fermentation, part of the carbohydrate is consumed by the yeast and additional growth of yeast takes place.

The period of fermentation may vary within wide limits, but the best results appear to be obtained in from three to ten days at temperatures varying from ordinary room temperature down to about 40° F. In general, the higher the temperature used, the more rapid the fermentation proceeds; but I prefer the use of a moderately cool temperature, between 50 and 70° F., since this is economical and avoids the tendency of rapid decomposition of the blood proteins at higher temperatures.

The action of the yeast is beneficial in various ways. During the fermentation, the blood is protected against putrefaction. The yeast also furnishes a valuable supplementary protein and also makes use of some of the blood constituents as a source of nitrogenous food, so that presumably the yeast converts some of the nitrogenous constituents of the blood to yeast protein. The fermented product therefore contains the added yeast as well as the yeast grown during the fermentation and the yeast proteins thus produced supplement the blood protein.

The yeast employed in making the new food products need not be a pure culture but may be a mixed growth with other organisms present and with the yeast predominating. The growth of the yeast will be accompanied by the conversion of some of the carbohydrate into alcohol and carbon dioxide simultaneously with the conversion of some of the nitrogenous constituents of the blood into yeast protein. Where the yeast or micro-organism results in the production of other products besides alcohol, these products, unless removed during the drying operation, may also be present in the final product.

The fermentation need not be carried to completion: i. e., until all of the carbohydrate possible has been fermented; but the fermentation can be regulated and discontinued when a marked increase in yeast content has taken place and when the desired change in the blood by the fermentation and the formation of the desired supplementary yeast protein has taken place.

The fermented product, after drying and grinding to the desired degree of fineness, is a composite food product containing the blood as modified by the fermentation and also containing the unfermented carbohydrate material and also containing the dried yeast both added and produced by the fermentation. It may also contain other products resulting from the fermentation. In case materials like bran are employed to supply part or all of the carbohydrate material, the bran will supply nitrogenous yeast food as well as carbohydrate and the final product will contain the residue of the bran. The amount of carbohydrate material employed can be widely varied, as above pointed out, so that it may form only a small part of the final product, e. g., around 10%, or so that it forms a major part of the final product, e. g., up to around 90%.

It will thus be seen that animal blood which is of low value as a food product is by the process of the present invention converted into an improved and valuable composite food product in which the blood, modified by the fermentation, is admixed with other ingredients including yeast protein etc., in part added and in part produced by the fermentation.

I claim:

1. As a new food product, the fermentation product of blood, carbohydrate material and micro-organisms from the fermentation, said product being in a dried state.

2. As a new food product, the fermentation product of blood, carbohydrate material and yeast, said product being in a dried state.

3. As a new product, the fermentation product of blood, starch and yeast, said product being in a dried state.

4. The method of producing a food product which comprises subjecting a mixture of blood and a carbohydrate material to fermentation with a suitable ferment, and drying and grinding the fermented product.

5. The method of producing a food product which comprises adding yeast to a mixture of blood and a carbohydrate material and allowing the fermentation to take place, and drying the resulting product.

In testimony whereof I affix my signature.

KENNETH K. JONES.